Aug. 6, 1929.  W. W. HOLLAND  1,723,698
DISTILLATION OF HYDROCARBON OILS
Filed Dec. 11, 1924  2 Sheets-Sheet 1

Aug. 6, 1929.  W. W. HOLLAND  1,723,698
DISTILLATION OF HYDROCARBON OILS
Filed Dec. 11, 1924   2 Sheets-Sheet 2

Inventor:
William W. Holland,
By Dynnforth, Lee, Chritton & Wiles,
Attys.

Patented Aug. 6, 1929.

1,723,698

UNITED STATES PATENT OFFICE.

WILLIAM W. HOLLAND, OF ALTON, ILLINOIS, ASSIGNOR TO STANDARD OIL COMPANY, OF WHITING, INDIANA, A CORPORATION OF INDIANA.

DISTILLATION OF HYDROCARBON OILS.

Application filed December 11, 1924. Serial No. 755,282.

The present invention relates to improvements in the distillation of hydrocarbon oils, and will be fully understood from the following description, illustrated by the accompanying drawings, in which.

Referring more particularly to the drawings, the numeral 5 indicates a still heated in any suitable manner (not shown), from which a vapor line 6 leads to a fractionating tower or column 7, in which dephlegmation of the vapors takes place. A reflux return line 8 leads from the lower portion of the dephlegmating column 7 back to the still 5. Uncondensed vapors issue from the fractionating column 7 through the vapor line 9 to a condensing apparatus of any suitable type (not shown).

Figure 1:
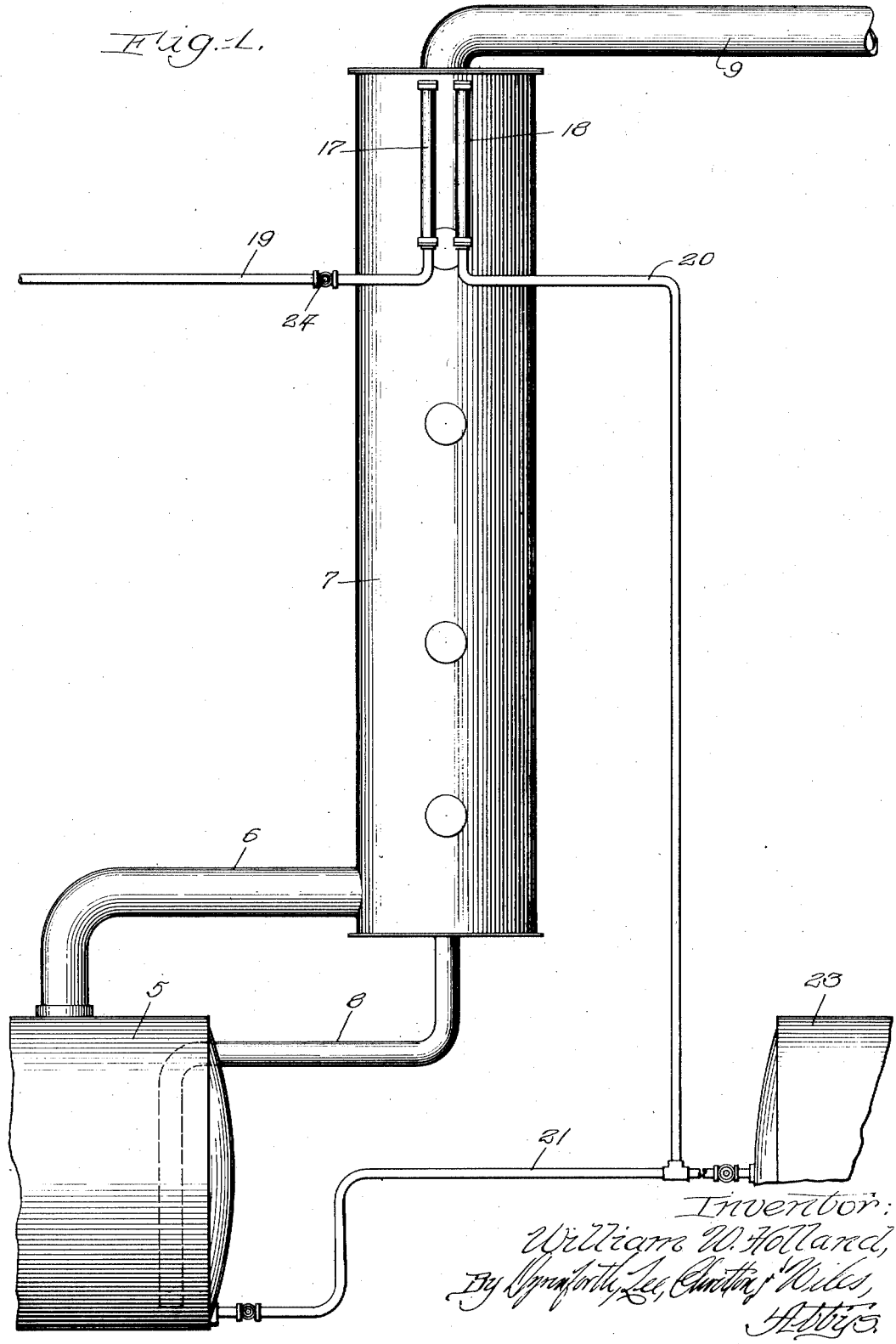
Figure 1 is a diagrammatic view of apparatus suitable for carrying the invention into effect.
Figure 2:
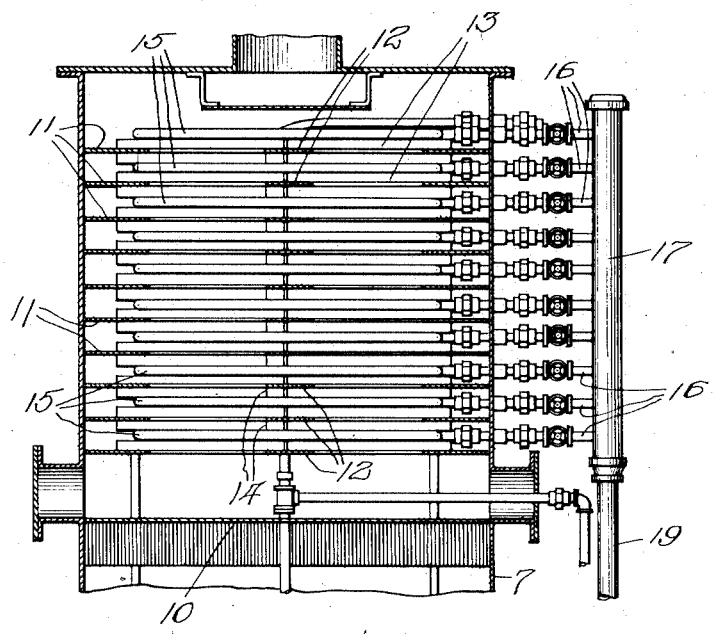
Fig. 2 is a vertical sectional view through the upper portion of a tower such as that illustrated in Fig. 1.
Figure 3:
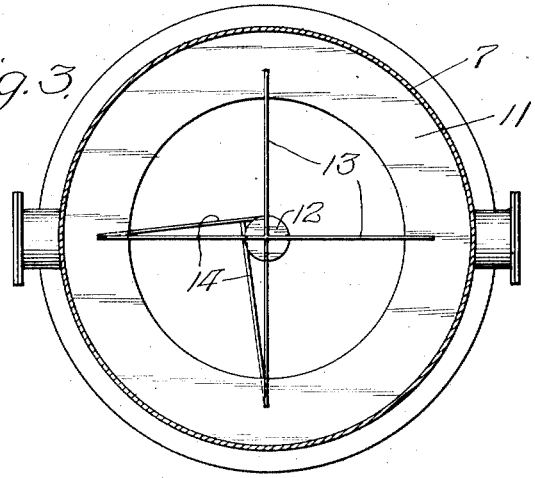
Fig. 3 is a horizontal sectional view through the portion of the tower shown in Fig. 2.

The fractionating column 7 may contain fractionating plates of any desired type, for example, of the tube and plate type shown in my prior application Serial No. 712,566, filed May 12, 1924, and illustrated at 10 in the sectional view of Fig. 2 of this application. In the upper portion of the column 7 there are provided a plurality of vertically spaced baffles consisting of the flat annuli 11 and the central disks 12, the latter being supported in position by transverse rods 13 extending across the upper surfaces of the baffles and rods 14 extending across the lower surfaces of the baffles. Between the baffles are located the horizontal spiral coils 15, the ends of which are connected by the short valved lines 16 with the intake and outlet manifold 17 and 18 respectively. The intake manifold 17 receives exhaust or live steam through a line 19. The outlet manifold 18 is connected with a steam line 20, by which the steam which has passed through the coils 15 is carried to a line 21, from which connections may be made either with the still 5, or with other stills, such as the still 23.

The process may be employed in connection with the distillation of any hydrocarbon oil products, but it is preferred that it be used in the distillation of lighter products, such as gasoline, kerosene, naphtha and the like. Thus, it may be employed in the distillation of crude oil, re-run stock, pressure distillate, naphtha bottoms, or the like.

The stock to be distilled, contained in the still 5, is heated in any suitable manner, the vapors passing into the tower 7. Exhaust or live steam at a temperature of 220 to 240° F., enters the manifold 17 through the line 19, and passed in parallel through the coils 15 in the upper portion of the column 7. The flow of steam is controlled to secure the desired temperature of the vapors issuing from the fractionating column 7, this control being effected by the valve 24 in the line 19, or by the valves in the lines 16 leading to the coils 15. The steam, after passing through the coils 15, is at a substantially higher temperature, say 325 to 425° F., depending upon the character of stock undergoing distillation and the nature of the condensate product desired. The heated steam is then employed in the further distillation of hydrocarbon oils by steam alone or by fire and steam, for example, in the stills 23, or may be introduced into the still 5 to aid in the distillation there.

As an example of the use of the present process a mid-continent crude oil of 34.5 to 35.5° A. P. I. gravity with 25 to 27% off at 374° F. on Engler distillation, was distilled in the still 5, the flow of steam through the coils 15 being controlled to produce a product of the character of gasoline and kerosene as successive condensate products. The gasoline cut, amounting to 36%, had a dry point of 427° F., an initial boiling point of 140° F., 36% of such gasoline being obtained. The refined oil cut showed an initial boiling point of 428° F., and a dry point of 506° F., the residue remaining in the still having an initial boiling point of 561° F.

I claim:

1. In the art of distilling hydrocarbon oils, subjecting the vapors rising from a distilling body of oil to partial fractionation, passing the partially fractionated vapors in indirect heat conductive contact with a current of steam at a temperature of 220 to 240° F., thereby heating the steam and partially condensing the vapors, returning the condensate thus formed to the still in countercurrent to the vapors rising therefrom, and passing the heated steam into direct contact with a distilling body of oil.

2. In the art of distilling hydrocarbon oils, subjecting the vapors rising from a distilling body of oil to partial fractionation, passing the partially fractionated vapors in indirect heat conductive contact with a current of steam at a temperature of 220 to 240° F., thereby heating the steam and partially condensing the vapors, returning the condensate thus formed to the still in countercurrent to the vapors rising therefrom, and passing the heated steam into the body of oil from which the vapors are rising.

WILLIAM W. HOLLAND.